Patented Mar. 23, 1954

2,673,173

UNITED STATES PATENT OFFICE 2,673,173

PREPARATION OF 1,1,3 - TRICHLORO - 2,3,3-TRIFLUOROPROPENE AND METHOD OF FUMIGATING THEREWITH

Robert P. Ruh, Midland, Mich., assignor to The Dow Chemical Company, Midland, Mich., a corporation of Delaware No Drawing. Application May 26, 1950, Serial No. 164,615

3 Claims. (Cl. 167—39)

This invention relates to the preparation of 1,1,3-trichloro-2,3,3-trifluoropropene and to its use as a fumigant.

1,1,3-trichloro-2,3,3-trifluoropropene is a chemical compound not described prior to my invention; this material is differentiated from related previously known compounds by its unexpected utility as an extremely effective fumigant. Its physical characteristics, e. g., high volatility, make its use as a space fumigant or as a package fumigant particularly advantageous. The killing power of the compound is entirely unexpected.

The compound of the invention is conveniently prepared by dehydrochlorination of 1,1,2,3-tetrachloro-2,3,3-trifluoropropane. The dehydrochlorination is conveniently effected by contacting the starting material with an alkali metal hydroxide. Since the dehydrochlorination is highly exothermic, the alkali metal hydroxide is usually added dropwise to the substituted propane in order to avoid an unduly violent reaction. It is helpful to reflux the mixture remaining after addition of the alkali metal hydroxide in order to assure complete reaction. Ordinarily, it is desired to use an excess (e. g., from 10 to 50 per cent) of the alkali metal hydroxide to effect dehydrochlorination.

The following example illustrates the preparation of 1,1,3-trichloro-2,3,3-trifluoropropene, and the use thereof as a fumigant, but is not to be construed as limiting the invention:

Example 1,1,2,3-tetrachloro-2,3,3-trifluoropropane (506 grams) was placed in a flask fitted wtih a reflux condenser and was then heated to reflux. Aqueous sodium hydroxide (500 grams of a 20 weight per cent solution) was then added dropwise to the stirred substituted propane in the flask. The rate of addition was controlled to avoid violent refluxing; when the addition was complete, the reaction mixture was refluxed for about five hours. The organic material was recovered from the reaction mixture by steam distillation; it was then separated from the aqueous layer and dried over anhydrous calcium chloride. Fractionation of the dried organic material yielded 275 grams of recovered starting material and 121 grams of the desired 1,1,3-trichloro-2,3,3-trifluoropropene, which had the following physical properties: boiling point 86.0° C.–86.5° C. at 742 mm. Hg; $n_D^{25°}$ 1.4012; density at 25° C. 1.5852 grams per cc.

1,1,3-trichloro-2,3,3-trifluoropropene was tested as a fumigant by placing caged black carpet beetle larvae and confused flour beetle adults in a fumigation vault, and admitting a measured amount of the propene into the vault. The 1,1,3-trichloro-2,3,3-trifluoropropene, in concentrations as low as 1.0 pound per 1000 cubic feet, was 100 per cent effective against the two species after 16 hours exposures; following exposure the beetles were in a normal atmosphere, and examination was made fourteen days after exposure. When the concentration was 0.5 pound per 1000 cubic feet, the compound was 100 per cent effective against the confused flour beetles, but only 88 per cent effective against the black carpet beetles.

I claim:

1. A method of producing 1,1,3-trichloro-2,3,3-trifluoropropene which comprises gradually adding an alkali consisting of aqueous sodium hydroxide to a body of refluxing 1,1,2,3-tetrachloro-2,3,3-trifluoropropane until there is added a proportion from 10 to 50 per cent in excess of that stoichiometrically required for dehydrochlorination, heating the resulting mixture under reflux until reaction is complete and fractionating 1,1,3-trichloro-2,3,3-trifluoropropene from the reacted mixture.

2. A method of fumigating beetles and beetle larvae which comprises treating them with 1,1,3-trichloro - 2,3,3 - trifluoropropene vaporized in lethal concentration into the atmosphere in contact with them.

3. A method of fumigating beetles and beetle larvae which comprises treating them with 1,1,3-trichloro-2,3,3-trifluoropropene vaporized into the atmosphere in contact therewith in an approximate concentration of from 0.5 to 1.0 pound per 1000 cubic feet.

ROBERT P. RUH.

References Cited in the file of this patent

UNITED STATES PATENTS

| Number | Name | Date |
|---|---|---|
| 2,344,061 | Renoll | Mar. 14, 1944 |
| 2,415,251 | Leavitt | Feb. 4, 1947 |
| 2,439,505 | Chaney | Apr. 13, 1948 |
| 2,456,768 | Chaney | Dec. 21, 1948 |
| 2,514,473 | Chaney | July 11, 1950 |
| 2,547,822 | Johnson et al. | Apr. 3, 1951 |
| 2,549,580 | Denison et al. | Apr. 17, 1951 |

FOREIGN PATENTS

| Number | Country | Date |
|---|---|---|
| 920,161 | France | Jan. 2, 1947 |